3,201,405
PHARMACOLOGICALLY ACTIVE DERIVATIVES OF N-METHYL-ISONIPECOTIC ACID
Paolo Galimberti, Pavia, and Vittorina Gerosa and Max Marcello Melandri, Milan, Italy, and Martin J. H. Kramer, Berlin-Charlottenburg, Germany, assignors to Società Italiana Prodotti Schering, Milan, Italy
No Drawing. Filed Aug. 7, 1962, Ser. No. 215,276
Claims priority, application Great Britain, Sept. 12, 1961, 32,718/61
10 Claims. (Cl. 260—294)

This invention is concerned with new pharmacologically active compounds. More particularly, the compounds with which this invention is concerned are members of the class consisting of N-methyl-isonipecotic acid derivatives of the general formula:

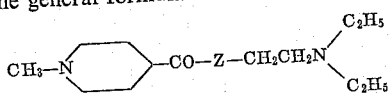

wherein Z represents oxygen or NH and their quaternary addition salts with hydrohalogenic acids and/or lower alkyl or alkenyl halogenides.

The compounds of the invention are highly effective as ganglionic stimulating and muscle relaxing agents. Their hypertensive activity is antagonised by hexamethonium, thus suggesting a nicotine like mode of action. For instance, the compound N-methyl-isonipecotinic acid, diethylaminoethylester methyl chloride hydrochloride, when administered at doses as low as 0.5 mg./kg. to cats under anesthesia from chloralose and urethan, causes a simultaneous hypertension and block of the neuromuscular transmission in the ischiatic-gastrocnemius preparate.

On the other hand, toxicity is fairly low in all compounds of the class.

The process of the invention starts from N-methyl-isonipecotic acid, which is used in the form of its quaternary addition salts with a hydrohalogenic acid or a lower alkyl halide.

The acid is reacted with diethylaminoethyl chloride or alternatively is converted into the corresponding acyl chloride and subsequently treated with N,N-diethylethylenediamine according to well known procedures, giving the diethylaminoethyl ester or alternatively the diethylaminoethylamide of the above general formula.

The corresponding quaternary addition salts are either obtained directly from the reaction mixture of the above described reactions, or simply by addition of the desired hydrohalogenic acid and/or alkyl or alkenyl halide to the obtained diethylaminoethyl ester or diethylaminoethylamide of N-methylisonipecotic acid.

The following non-limitative examples illustrate the invention.

*Example 1.—N-methylisonipecotic acid diethylaminoethyl ester methyl chloride*

A mixture of 5 g. of ammonium chloride and 11.75 g. of methyl N-methylisonipecotate is slowly heated on an oil bath and in vacuo at 250° C. and this temperature is maintained for 1 hour. The excess methyl ester is distilled off, the residue is dissolved in 20 ml. of water and the solution diluted with a mixture acetoneethanol 10:1. The precipitate is collected and has M.P. 242–245° C. The obtained N-methylisonipecotic acid methyl chloride (20 g.) is added to a solution of 5.8 g. of potassium hydroxide in 80 ml. of ethanol followed by 14 g. of diethylaminoethyl chloride. The mixture is refluxed for 4 hours, then it is cooled, the potassium chloride so obtained is filtered off and the solvent removed in vacuo. The oily residue is recrystallised from methanol. The compound is N-methylisonipecotic acid diethylaminoethyl ester methyl chloride (1,1-dimethyl-4-(2'-diethylamino)-carbethoxypiperidinium chloride); M.P. 238–241° C.

*Example 2.—N-methylisonipecotic acid diethylaminoethyl ester methyl chloride hydrochloride*

The above obtained N-methylisonipecotic acid diethylaminomethyl ester methyl chloride is dissolved in ethanol and hydrogen chloride is bubbled into the solution to acidic reaction, then the solution is diluted with diethyl ether.

The precipitate is N-methylisonipecotic acid diethylaminoethyl ester methyl chloride hydrochloride (1,1-dimethyl-4-(2'-diethylamino) - carbethoxy - piperidinium chloride hydrochloride); M.P. 228–232° C.

*Example 3.—N-methylisonipecotic acid diethylaminoethyl ester dihydrochloride*

Prepared for N-methylisonipecotic acid hydrochloride exactly as described in Example 2 for the hydrochloride methyl chloride; M.P. 190–192° C.

*Example 4.—N-methylisonipecotic acid diethylaminoethyl ester ethyl iodide methyl iodide*

A mixture of 20 g. of N-methylisonipecotic acid diethylaminoethyl ester methyl chloride, 22.5 g. of ethyl iodide and 250 ml. of ethanol is refluxed for 5 hours, then it is cooled and diluted with diethyl ether. The separated clear viscous oil is N-methylisonipecotic acid diethylaminoethyl ester ethyl iodide methyl iodide [1,1-dimethyl-4-(2'-triethylammonium)-carbethoxypiperidinium di-iodide].

Analysis for $C_{16}H_{32}N_2O_2I_2$: Calc. C, 35.71; H, 5.99; N, 5.21; I, 47.10. Found: C, 36.02; H, 6.14; N, 5.09; I, 47.35.

*Example 5.—N-methylisonipecotic acid diethylaminoethylamide*

A mixture of 10 g. of N-methylisonipecotyl chloride hydrochloride, 5.9 g. of N,N-diethylethylenediamine, 5 g. of sodium carbonate and 40 ml. of benzene is refluxed for two hours, then it is filtered, the solvent is removed and the residue is distilled collecting at 150–160° C./0.5 mm. On cooling the product becomes solid; M.P. 56° C.

*Example 6.—N-methylisonipecotic acid diethylaminoethylamide dihydrochloride*

Prepared from the compound obtained in Example 5, acidifying with hydrogen chloride an ethanol solution of the same and precipitating the dihydrochloride by dilution with diethyl ether. M.P. 116–118° C.

*Example 7.—N-methylisonipecotic acid diethylaminoethylamide bismethyl iodide*

A mixture of 20 g. of N-methylisonipecotic acid diethylamide, 29.8 g. of methyl iodide and 250 ml. of ethanol is refluxed for 4 hours, then the mixture is cooled and diluted with diethyl ether. M.P. 241–242° C.

*Example 8.—N-methylisonipecotic acid diethylaminoethylamide bisethyl iodide*

Prepared by the process described in Example 7 substituting ethyl iodide for methyl iodide. M.P. 110–115° C. (dec.).

*Example 9.—N-methylisonipecotic acid diethylaminoethylamide bis-allyl bromide*

Prepared by the process described in Example 7 substituting allyl bromide for methyl iodide. M.P. 86–90° C.

We claim:
1. A compound selected from the class consisting of N-methylisonipecotic acid derivatives of the formula:

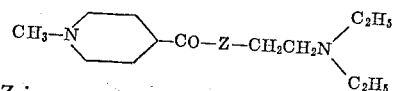

wherein Z is a member of the class consisting of oxygen and NH, hydrohalide acid addition and methyl, ethyl and allyl halides quaternary ammonium salts thereof.

2. N-methylisonipecotic acid diethylaminoethyl ester dihydrochloride.

3. N-methylisonipecotic acid diethylaminoethylamide.

4. N-methylisonipecotic acid diethylaminoethylamide dihydrochloride.

5. 1,1 - dimethyl - 4 - (2' - diethylamino) - carbethoxy-piperidinium chloride.

6. 1,1-dimethyl-4-(2'-diethylamino)-carbethoxy-piperidinium chloride hydrochloride.

7. 1,1 - dimethyl-4-(2'-triethylammonium - carbethoxy-piperidinium di-iodide.

8. The bis-methyl iodide quaternary ammonium salt of N-methyl-isonipecotic acid diethylamino ethylamide.

9. The bis-ethyl iodide quaternary ammonium salt of N-methylisonipecotic acid diethylaminoethylamide.

10. The bis-allyl bromide quaternary ammonium salt of N-methylisonipecotic acid diethylaminoethylamide.

References Cited by the Examiner

Galimberti et al., "Bell Chim. Marm," vol. 100, pages 482–9 (1961).

NICHOLAS S. RIZZO, *Primary Examiner.*

WALTER A. MODANCE, *Examiner.*